(12) United States Patent  
Horiuchi et al.

(10) Patent No.: US 11,057,644 B2  
(45) Date of Patent: Jul. 6, 2021

(54) DISTRIBUTION SYSTEM, CLIENT TERMINAL, AND METHOD OF CONTROLLING DISPLAY

(71) Applicants: Takeshi Horiuchi, Tokyo (JP); Hideki Shiro, Kanagawa (JP); Hiroshi Hinohara, Kanagawa (JP); Ryo Ogawa, Kanagawa (JP)

(72) Inventors: Takeshi Horiuchi, Tokyo (JP); Hideki Shiro, Kanagawa (JP); Hiroshi Hinohara, Kanagawa (JP); Ryo Ogawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 62 days.

(21) Appl. No.: 16/460,091

(22) Filed: Jul. 2, 2019

(65) Prior Publication Data

US 2020/0037000 A1 Jan. 30, 2020

(30) Foreign Application Priority Data

Jul. 30, 2018 (JP) .............................. JP2018-142997

(51) Int. Cl.
*H04N 19/172* (2014.01)
*H04N 19/176* (2014.01)
*H04N 19/597* (2014.01)
*H04L 9/08* (2006.01)
*G06F 21/12* (2013.01)

(52) U.S. Cl.
CPC ......... *H04N 19/597* (2014.11); *G06F 21/121* (2013.01); *H04L 9/0822* (2013.01); *H04N 19/172* (2014.11); *H04N 19/176* (2014.11)

(58) Field of Classification Search
None
See application file for complete search history.

(56) References Cited

U.S. PATENT DOCUMENTS 5,900,954 A * 5/1999 Katz ...................... G03H 1/041  
                                                                 283/86  
5,991,403 A * 11/1999 Aucsmith ............ H04N 7/1675  
                                                                 348/E7.056

(Continued)

FOREIGN PATENT DOCUMENTS

JP          2002-353957          12/2002

OTHER PUBLICATIONS

Chan et al., "Key Management Approaches to Offer Data Confidentiality for secure Multicast", IEEE Network, Sep./Oct. 2003.*

*Primary Examiner* — Mohammad J Rahman  
(74) *Attorney, Agent, or Firm* — IPUSA, PLLC

(57) ABSTRACT

A distribution system includes circuitry to: encrypt a part of each of a plurality of images constituting a video image, the part having an angle of view other than a normal angle of view; provide a decryption key to a receiving client terminal operated by an authorized viewer; decrypt the part of each of the plurality of images having the angle of view other than the normal angle of view by using the decryption key provided; and display the video image based on other part of each of the plurality of images that is not encrypted having the normal angle of view and the decrypted part of each of the plurality of images having the angle of view other than the normal angle of view.

6 Claims, 14 Drawing Sheets

(56) References Cited

U.S. PATENT DOCUMENTS

| | | | |
|---|---|---|---|
| 7,216,232 B1* | 5/2007 | Cox | G06T 1/0021 713/176 |
| 7,970,169 B2* | 6/2011 | Piersol | G06F 21/16 382/101 |
| 8,572,695 B2* | 10/2013 | Bailloeul | G06F 3/002 726/21 |
| 8,601,280 B2* | 12/2013 | Harada | G06F 21/121 713/189 |
| 9,256,720 B2* | 2/2016 | Berini | G06K 9/00604 |
| 9,577,987 B2* | 2/2017 | Faith | H04L 67/22 |
| 9,740,836 B2* | 8/2017 | Sugiura | G06F 21/105 |
| 9,773,128 B2* | 9/2017 | Tsang | G06F 21/72 |
| 9,798,290 B2* | 10/2017 | Tsang | G03H 1/0841 |
| 10,671,906 B1* | 6/2020 | Marchan | G06K 19/06112 |
| 2001/0037316 A1* | 11/2001 | Shiloh | G06F 21/6254 705/74 |
| 2002/0184517 A1* | 12/2002 | Tadayon | G06F 21/10 726/27 |
| 2003/0135466 A1* | 7/2003 | Wang | G06Q 30/06 705/51 |
| 2004/0088554 A1* | 5/2004 | Kawaguchi | G06F 12/1433 713/189 |
| 2005/0187831 A1* | 8/2005 | Gershburg | G06Q 10/087 705/27.2 |
| 2006/0078113 A1* | 4/2006 | Javidi | G03H 1/0866 380/210 |
| 2006/0147083 A1* | 7/2006 | Piersol | G06F 21/16 382/100 |
| 2006/0227671 A1* | 10/2006 | Tobita | G03H 1/26 369/30.01 |
| 2007/0030178 A1* | 2/2007 | Lee | H04N 21/41407 341/50 |
| 2007/0230703 A1* | 10/2007 | Barrus | H04L 9/0819 380/277 |
| 2007/0285554 A1* | 12/2007 | Givon | G03H 1/268 348/340 |
| 2008/0012850 A1* | 1/2008 | Keating, III | H04N 13/254 345/419 |
| 2008/0063191 A1* | 3/2008 | Hatano | G06F 21/6209 380/45 |
| 2009/0136221 A1* | 5/2009 | Nakamura | H04N 1/00204 396/1 |
| 2009/0276826 A1* | 11/2009 | Ando | G06F 21/608 726/1 |
| 2011/0141218 A1* | 6/2011 | Stancato | G06F 21/10 348/14.01 |
| 2011/0231922 A1* | 9/2011 | Azuma | H04W 12/06 726/9 |
| 2011/0320956 A1* | 12/2011 | Singh | G06Q 30/0241 715/747 |
| 2012/0134496 A1* | 5/2012 | Farkash | H04N 7/167 380/210 |
| 2013/0051557 A1* | 2/2013 | Shimamura | G06F 21/608 380/255 |
| 2013/0058477 A1* | 3/2013 | Kobayashi | H04L 9/3239 380/28 |
| 2013/0268444 A1* | 10/2013 | Namgoong | H04L 63/0861 705/71 |
| 2014/0115338 A1* | 4/2014 | Faith | H04L 63/0428 713/176 |
| 2014/0314235 A1* | 10/2014 | Matischek | H04N 1/4486 380/243 |
| 2015/0304736 A1* | 10/2015 | Lal | G06F 21/10 380/210 |
| 2016/0070892 A1* | 3/2016 | Leonard | G06F 21/16 726/26 |
| 2016/0198202 A1* | 7/2016 | Van Brandenburg | H04N 21/4405 725/31 |
| 2016/0246057 A1* | 8/2016 | Hasegawa | H04N 5/7491 |
| 2016/0261769 A1* | 9/2016 | Yamada | H04W 76/14 |
| 2016/0352709 A1* | 12/2016 | Nunally | H04L 63/061 |
| 2017/0090418 A1* | 3/2017 | Tsang | G03H 1/0841 |
| 2017/0237970 A1* | 8/2017 | Karafin | H04N 13/204 348/262 |
| 2017/0251261 A1* | 8/2017 | James | H04N 21/2393 |
| 2017/0339392 A1* | 11/2017 | Forutanpour | H04N 19/597 |
| 2017/0359456 A1* | 12/2017 | Shrubsole | G06F 1/163 |
| 2018/0032708 A1* | 2/2018 | Mori | G06F 21/31 |
| 2018/0046758 A1* | 2/2018 | Gogin | G06F 19/321 |
| 2018/0097682 A1 | 4/2018 | Yoshida et al. | |
| 2018/0098105 A1 | 4/2018 | Morita et al. | |
| 2018/0189505 A1* | 7/2018 | Ghafourifar | G06F 21/6209 |
| 2018/0191787 A1 | 7/2018 | Morita et al. | |
| 2018/0227457 A1 | 8/2018 | Morita et al. | |
| 2018/0300577 A1* | 10/2018 | Kendrick | G06K 9/3241 |
| 2018/0357036 A1* | 12/2018 | Tomita | H04N 7/147 |
| 2019/0082144 A1 | 3/2019 | Hakata et al. | |
| 2019/0098211 A1 | 3/2019 | Ohmura et al. | |
| 2019/0098253 A1 | 3/2019 | Soneda et al. | |

* cited by examiner

FIG. 6A

| POST-CONVERSION COORDINATE VALUE | | PRE-CONVERSION COORDINATE VALUE | |
|---|---|---|---|
| $\theta$ (pix) | $\phi$ (pix) | x (pix) | y (pix) |
| 0 | 0 | | |
| 1 | 0 | | |
| ⋮ | ⋮ | ⋮ | ⋮ |
| 3598 | 1799 | | |
| 3599 | 1799 | | |

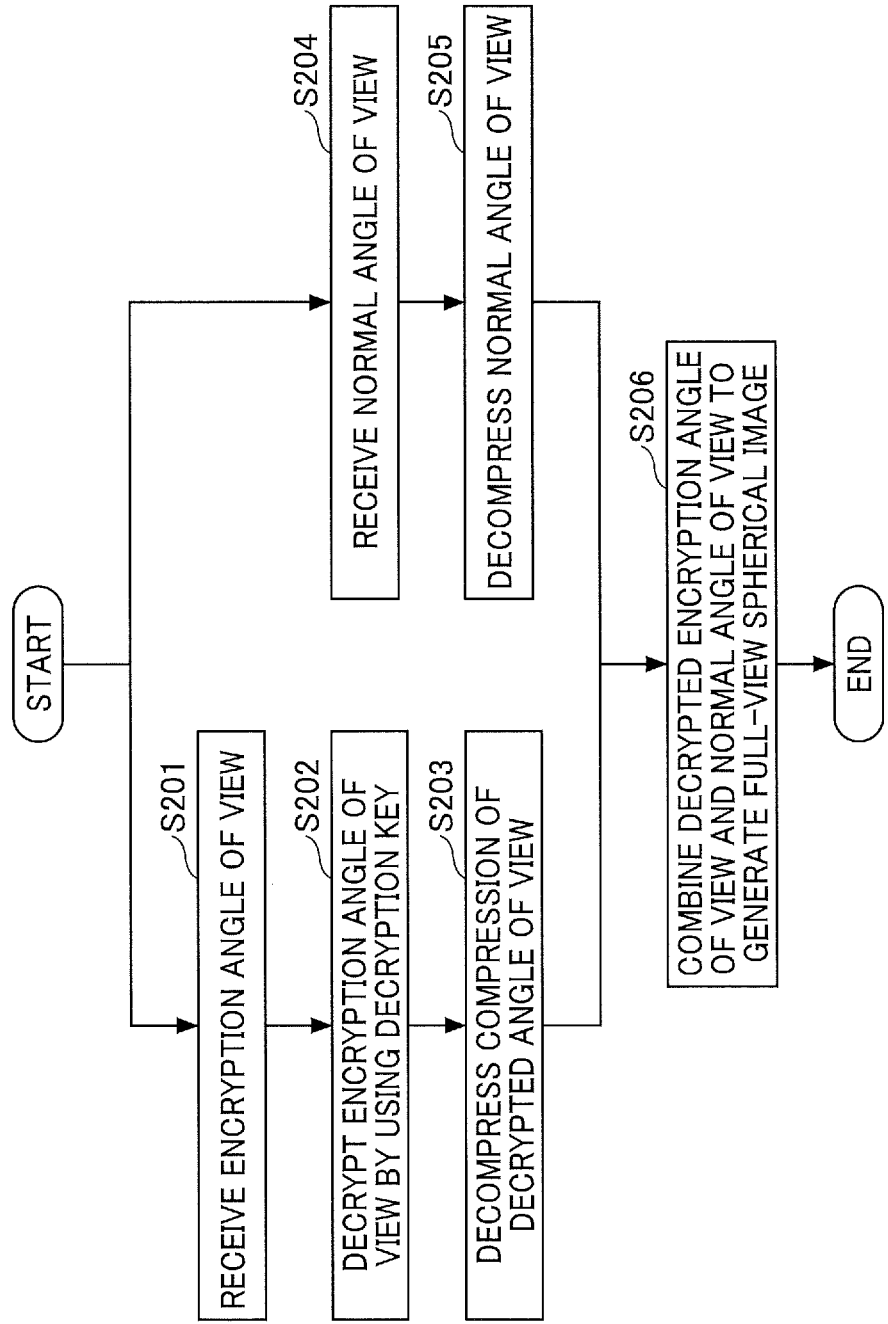

DISTRIBUTION SYSTEM, CLIENT TERMINAL, AND METHOD OF CONTROLLING DISPLAY

CROSS-REFERENCE TO RELATED APPLICATION

This patent application is based on and claims priority under 35 U.S.C. § 119(a) to Japanese Patent Application No. 2018-142997, filed on Jul. 30, 2018, the entire disclosure of which is incorporated herein by reference.

BACKGROUND

Technical Field

The present disclosure relates to a distribution system, a client terminal, and a method of controlling display.

Description of the Related Art

Imaging devices are known that capture an omnidirectional 360-degree image by one-time capturing operation. Such omnidirectional image is referred to as a "spherical image". Some of the imaging devices can capture the spherical image as a video. Distribution systems are also known that store spherical images in a server or the like and distribute the spherical images stored in the server or the like, allowing a user using a client terminal to view a desired spherical image received by the client terminal.

Further, in video image distribution systems, a technique is known that encrypts a part of a video image to be distributed and distribute the video image including the encrypted part for enhancing security.

SUMMARY

According to an embodiment, a distribution system includes circuitry to: encrypt a part of each of a plurality of images constituting a video image, the part having an angle of view other than a normal angle of view; provide a decryption key to a receiving client terminal operated by an authorized viewer; decrypt the part of each of the plurality of images having the angle of view other than the normal angle of view by using the decryption key provided; and display the video image based on other part of each of the plurality of images that is not encrypted having the normal angle of view and the decrypted part of each of the plurality of images having the angle of view other than the normal angle of view.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIGS. 6A and 6B are illustrations for describing an example of projection from a partial-view image represented by a plane coordinate system to an image represented by a spherical coordinate system, according to an embodiment of the present disclosure;

FIG. 13 is a flowchart illustrating a decryption process performed by a decryption unit of the receiving client, according to an embodiment of the present disclosure.

Figure 1:
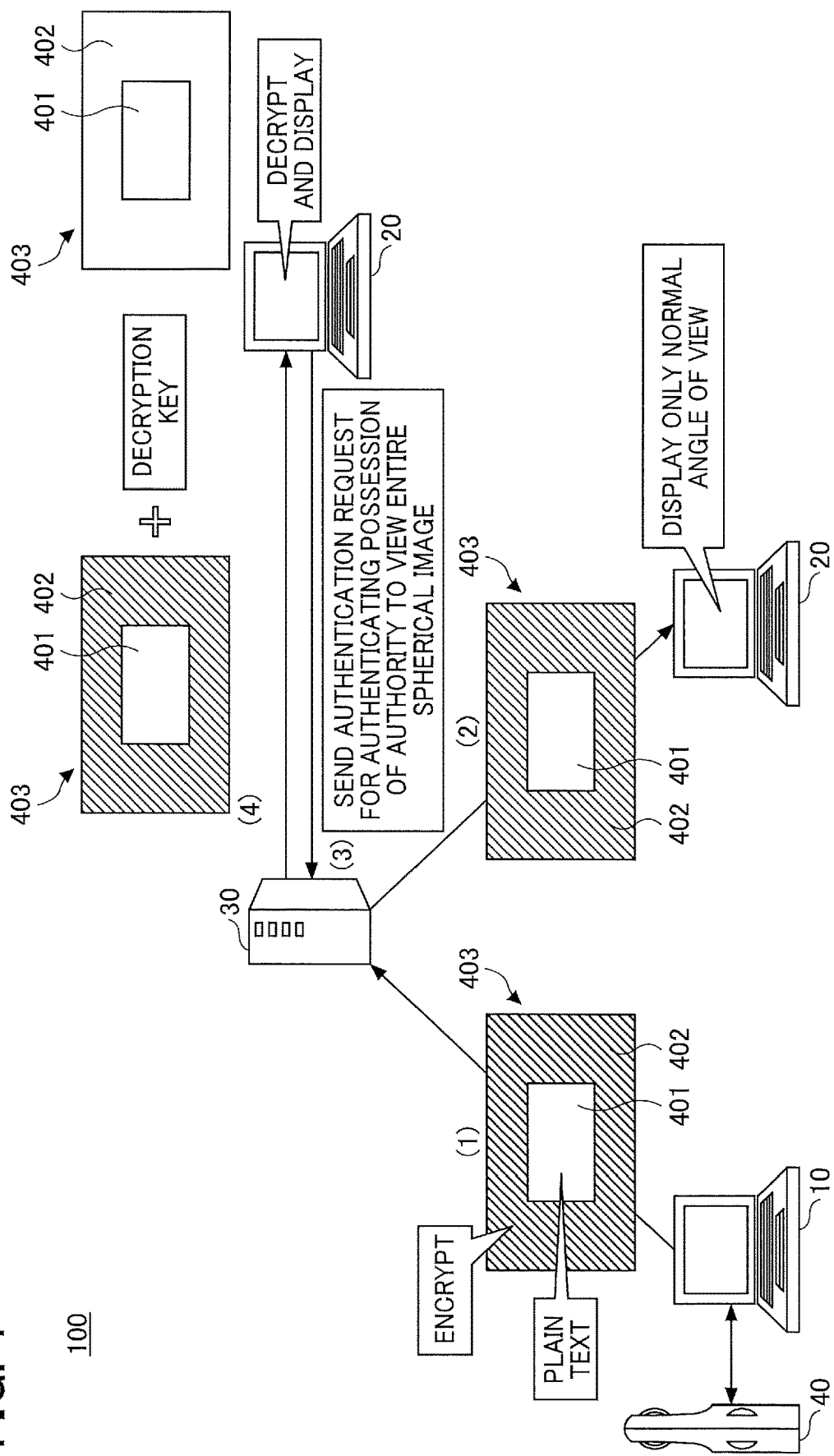
FIG. 1 is an illustration for describing an overview of a configuration and an operation of a distribution system, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION OF THE DRAWINGS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

Hereinafter, a description is given of a distribution system and a distribution method performed by the communication system according to an example embodiment of the present disclosure, with reference to the drawings.

<Overview of Operation by Distribution System>

Referring to FIG. 1, a description is given of an overview of an operation by a distribution system 100, according to an embodiment of the present disclosure. FIG. 1 is an illustration for describing an overview of a configuration and an operation of the distribution system 100.

The distribution system 100 includes a sending client 10, a management server 30, and a receiving client 20. The sending client 10 transmits a video image to the receiving client 20 via the management server 30 in real time, for example. The sending client 10 is an example of a sending client terminal. The receiving client 20 receives the video image from the sending client 10 in real time. The receiving client 20 is an example of a receiving client terminal.

(1) The sending client 10 encrypts an angle of view other than a normal angle of view of a spherical image 403 captured by an imaging device 40. The spherical image can be either a still image or a video image. In the present embodiment, a description is given mainly on the assumption that the spherical image is a video image. For example, the spherical image 403 is divided into a plurality of areas. A part that is not to be encrypted of these areas of the spherical image 403 is referred to as a "normal angle of view 401". A part other than the normal angle of view 401 of the spherical image to be encrypted is referred to as an "encryption angle of view 402". The normal angle of view 401 is an angle of view identified by a distributor as an angle of view to be viewed by all viewers. The encryption angle of view 402 is an angle of view identified by the distributor as an angle of view to be viewed only by a viewer(s) who has authorization.

In Case where Viewer does not have Authorization to View Entire Spherical Image:

(2) A viewer who does not have authorization to view the entire spherical image 403 is referred to as a "general viewer" hereinafter. When the general viewer views the spherical image 403, the general viewer operates the receiving client 20 to communicate with the management server 30. Authentication may be performed even in a case where a viewer is the general viewer. The receiving client 20 displays the normal angle of view 401 of the spherical image 403. However, the encryption angle of view 402 has been encrypted, and therefore the general viewer can view only the normal angle of view.

In Case where Viewer has Authorization to View Entire Spherical Image:

(3) A viewer who has authorization to view the entire spherical image 403 is referred to as an "authorized viewer" hereinafter. The authorized viewer firstly requests the management server 30 to authenticate that the viewer is an authorized user.

(4) When the authentication is successful, the management server 30 transmits a decryption key to the receiving client 20. The receiving client 20 decrypts the encryption angle of view 402 that has been encrypted of the spherical image 403 by using the decryption key and combines the decrypted encryption angle of view 402 with the normal angle of view 401 to generate one spherical image 403. This process is performed on each frame of the video image. Thus, the receiving client 20 can display not only an image of the normal angle of view 401 but also an image of the encryption angle of view 402, allowing the authorized viewer to view the entire spherical image 403.

As described above, the distribution system 100 according to the present embodiment encrypts a part of a spherical image and distributes the spherical image having the encrypted part. This restricts viewing of the encryption angle of view by the general viewer, and permits viewing of the entire spherical image by the authorized viewer. Therefore, viewing of a part of the spherical image can be controlled.

<<Terms Used in the Embodiments>>

A term "video image" refers to images of moving objects, so-called moving images. The "video image" is also often called "video".

A term "normal angle of view" refers to an angle of view that is not to be encrypted. For example, the normal angle of view is specified by fixed coordinates determined in advance in the spherical image. In another example, a user of the sending client 10 can specify a desired angle of view. A term "encryption angle of view" refers to an angle of view to be encrypted. From among the entire spherical image, a part other than the normal angle of view is the encryption angle of view. In other words, from among the entire spherical image, a part other than the encryption angle of view is the normal angle of view.

A term "viewer" refers to a person who view the video image. In another example, the viewer can be called a "user", a "participant" or a "member". A term "authorized viewer" refers to a person who is registered as a person who has authorization to view the encryption angle of view.

A term "spherical image" refers to an image obtained by capturing surroundings in 360-degree directions. However, such capturing of the 360-degree surroundings is just one example. In another example, the spherical image includes a wide-angle image having a wide angle of view that requires a user to change the angle of view to view the full angle of view. For example, the spherical image can be hemispherical image or an image having an angle of view of 180 to 360 degrees in the horizontal direction.

<System Configuration>

Referring again to FIG. 1, a description is given of a system configuration of the distribution system 100. The sending client 10 and the receiving client 20 are communicable with management server 30 via a network. Although in the example of FIG. 1, the distribution system 100 includes one sending client 10 and one receiving client 20, the distribution system 100 can include a plurality of sending clients 10 and a plurality of receiving clients 20.

The network can be any suitable general-purpose network such as the Internet. In another example, the network can include a local area network (LAN) in a company or a home, or a wide area network including a plurality of LANs. The network may be partially or entirely wireless. The wireless network can include a wireless LAN, WiMAX, and mobile phone networks such as 3G, 4G, and 5G.

Each of the sending client 10 and the receiving client 20 is a general-purpose information processing apparatus having at least a communication function and a display function. More accurately, the sending client 10 is a sending client terminal, and the receiving client 20 is a receiving client terminal. Since the sending client 10 does not display the spherical image, the display function can be omitted from the sending client 10.

Examples of the information processing apparatus as the sending client 10 and the receiving client 20 include a personal computer (PC), a tablet terminal, a smartphone, a mobile phone, and a wearable PC such as a smartwatch. In addition to the above, the information processing apparatus as the sending client and the receiving client can be any suitable device such as an electronic whiteboard, a video-conference terminal, a digital signage terminal, or a car navigation system, provided that it has an information processing function. Browser software or application software dedicated to the distribution system 100 operates in each of the sending client 10 and the receiving client 20.

The management server 30 is implemented by a so-called server apparatus and has a function of an information processing apparatus. A server is a computer that provides files, data, etc. to other computers communicably connected thereto through a network. The server may be called a web server, an HTTP (Hypertext Transfer Protocol) server, a WWW (World Wide Web) server, etc. In the present embodiment, the management server 30 authenticates a viewer. Further, the management server 30 generates and manages an encryption key and a decryption key. Furthermore, the management server 30 transmits the decryption key to the receiving client 20, when the authentication is successful and the management server 30 determines that the viewer is an authorized viewer.

In one example, the spherical image and the decryption key are transmitted as components of the application software. In another example, the spherical image and the decryption key are transmitted as screen information (web page). When the spherical image and the decryption key are transmitted as components of the application software, the application software decrypts the encryption angle of view by using the decryption key and displays the decrypted encryption angle of view at a specific position. When the spherical image and the decryption key are transmitted as screen information (web page), the screen information is described in a HTML (Hyper Text Markup Language), a script language, a CSS (Cascade Style Sheet) or the like. The receiving client 20 executes the script language to decrypt the encryption angle of view of the spherical image by using the decryption key. If the authentication fails, the management server 30 does not transmit the decryption key to the receiving client 20. Accordingly, the receiving client 20 cannot decrypt the encryption angle of view.

In another example, the management server 30 provides the sending client 10 and the receiving client 20 with a web application. The "web application" refers to software used on a web browser. The web application is implemented by a cooperation between a program written in a script language such as JavaScript (registered trademark) that operates on browser software and a program provided by a web server. Further, the web application refers to a mechanism that implements such software.

<Example of Hardware Configuration>

Next, a description is given of hardware configurations of the sending client 10, the receiving client 20, the management server 30, and the imaging device 40 included in the distribution system 100 according to the present embodiment.

<<Example of Hardware Configuration of Receiving Client 20, Sending Client 10, and Management Server 30>>

Figure 2:
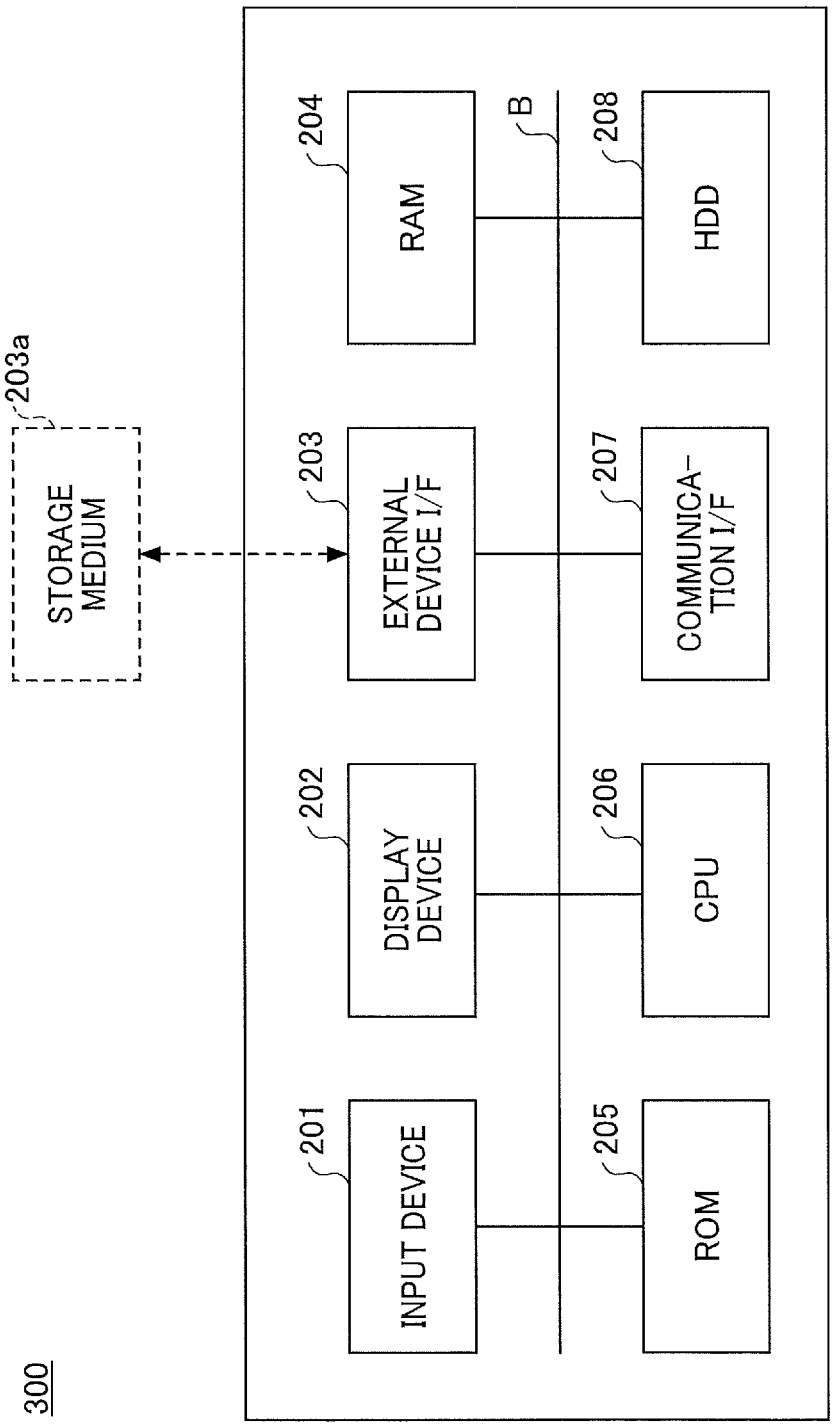
FIG. 2 is a block diagram illustrating an example hardware configuration of a computer system, according to an embodiment of the present disclosure.

Each of the receiving client 20, the sending client 10, and the management server 30 is implement by, for example, a computer system having a hardware configuration as illustrated in FIG. 2. FIG. 2 is a block diagram illustrating an example hardware configuration of a computer system 300 according to the present embodiment.

As illustrated in FIG. 2, the computer system 300 includes an input device 201, a display device 202, an external device interface (I/F) 203, a random access memory (RAM) 204, a read only memory (ROM) 205, a central processing unit (CPU) 206, a communication I/F 207, and a hard disc drive (HDD) 208, which are connected to one another via a bus B.

The input device 201 includes a keyboard, a mouse, and/or a touch panel enabling a user to input various operation signals. The display device 202 includes a display and displays results of processing performed by the computer system 300.

The communication I/F 207 is an interface that connects the computer system 300 to an intra-company network, the Internet, and the like. The computer system 300 communicates data with extraneous sources via the communication I/F 207.

The HDD 208 is a nonvolatile storage device that stores programs and data. Examples of the programs or data stored in the HDD 208 include an operating system (OS) for controlling an entire operation of the computer system 300 and application software providing various functions on the OS. The HDD 208 manages the programs or data stored therein by a predetermined file system and/or a predetermined database (DB).

The external device I/F 203 is an interface that connects the computer system 300 to extraneous sources. Examples of the extraneous sources include a storage medium 203a. The computer system 300 reads or writes data from or to the storage medium 203a via the external device I/F 203. Examples of the storage medium 203a include a flexible disc, a compact disc (CD), a digital versatile disc (DVD), a secure digital (SD) memory card, and a universal serial bus (USB) memory.

The ROM 205 is a nonvolatile semiconductor memory (storage device), which holds programs and data even after the computer system 300 is turned off as the power is not supplied. The ROM 205 stores programs and data such as a Basic Input/Output System (BIOS), which is activated when the computer system 300 is started up, OS settings, and network settings. The RAM 204 is a volatile semiconductor memory (storage device), which temporarily stores programs and data.

The CPU 206 loads programs or data from a storage device such as the ROM 205 and the HDD 208 onto the RAM 204 and executes processes to control entire operation of the computer system 300 and implement functions of the computer system.

It is preferable that the management server 30 supports cloud computing. The "cloud computing" refers to Internet-based computing where resources on a network are used or accessed without identifying specific hardware resources.

<<Hardware Configuration of Imaging Device 40>>

Figure 3:
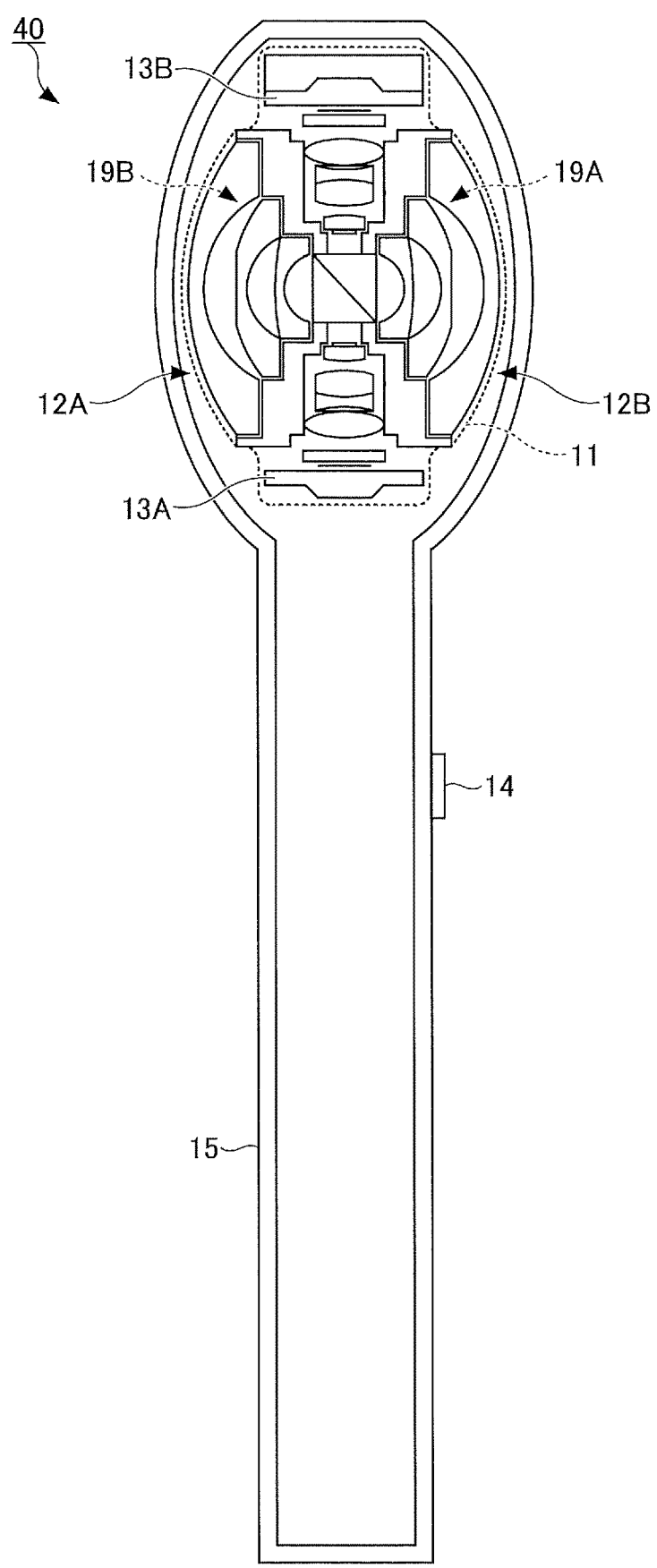
FIG. 3 is an example of a cross-sectional view of an imaging device, according to an embodiment of the present disclosure.

FIG. 3 is a cross-sectional view of the imaging device 40 according to the present embodiment. The imaging device 40 is an imaging device called a celestial-sphere camera, for example. The imaging device 40 includes an imaging body 11, a housing 15 that holds the imaging body 11 and components such as a controller and a battery, and a shutter button 14 provided on the housing 15.

The imaging body 11 as illustrated in FIG. 3 includes two image forming optical systems 12A and 12B, and two solid-state imaging elements 13A and 13B such as a charge coupled device (CCD) sensor or a complementary metal oxide semiconductor (CMOS) sensor. A pair of the image forming optical system 12A and the solid-state imaging element 13A is referred to as an imaging optical system 19A. A pair of the image forming optical system 12B and the solid-state imaging element 13B is referred to as an imaging optical system 19B.

Each of the image forming optical systems 12A and 12B includes a fisheye lens having seven lenses in six groups, for example. The fisheye lens has a full angle of view wider than 180 degrees (=360 degrees/n, n is 2). Preferably, the fisheye lens has an angle of view equal to or wider than 185 degrees, and more preferably, each of the fish-eye lens has an angle of view equal to or wider than 190 degrees. This configuration implements an omnidirectional 360-degree image capturing.

<Configuration of Spherical Image>

Hereinafter, a description is given of a configuration of a spherical image, with reference to FIGS. 4A and 4B to FIGS. 7A and 7B.

Figure 4A:
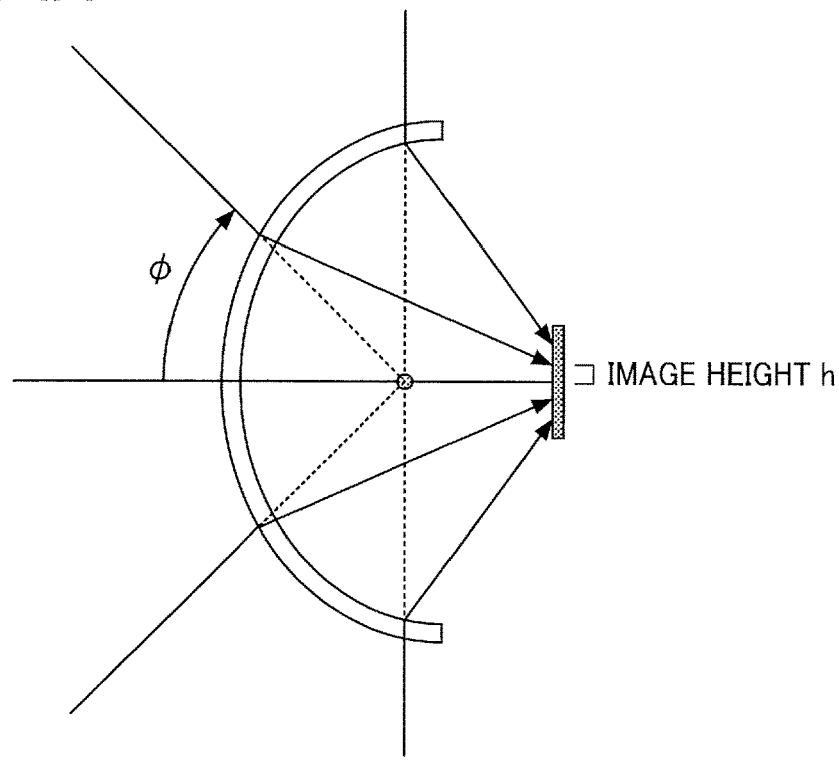
FIG. 4A and FIG. 4B are illustrations for describing a projection relation in the imaging device using a wide-angle lens, according to an embodiment of the present disclosure.
Figure 4B:
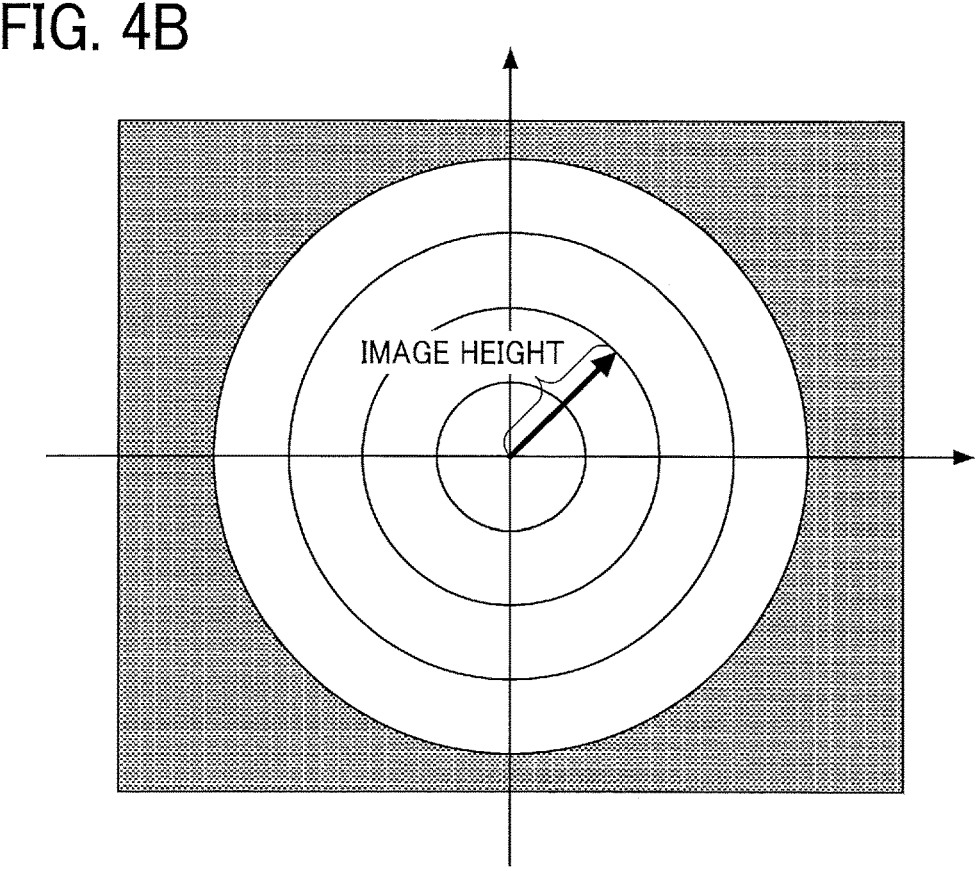

FIG. 4A and FIG. 4B are illustrations for describing a projection relation in the imaging device 40 using a wide-angle lens. In the present embodiment, one wide-angle lens captures an image covering a substantially hemispherical area seen from an image capturing point. Further, the wide-angle lens generates an image having an image height h that corresponds to an angle of incidence φ relative to an optical axis. As illustrated in FIG. 4A, the relation between the image height h and the angle of incidence φ is determined by a projection function according to a prescribed projection model. The projection function varies depending on the properties of the fisheye lens. When a fisheye lens adopts the equidistance projection as a projection model, the projection function is expressed by [Formula 1] given below where f denotes the focal length.

$$h = f \times \varphi \quad \text{[Formula 1]}$$

The projection model can be any other suitable projection model such as the central projection ($h=f*\tan \varphi$), the stereographic projection ($h=2f*\tan(\varphi/2)$), the equi-solid-angle projection ($h=2f*\tan(\varphi/2)$), and the orthogonal projection ($h=f*\sin \varphi$). In any of the projections, the image height h of a formed image is determined according to the incident angle φ and the focal length f relative to the optical axis. Further, in the present embodiment, it is assumed that a so-called circular fisheye lens having an image circle diameter shorter than a diagonal line of an image is adopted. As illustrated in FIG. 4B, a partial-view image obtained with such lens is a planar image, which includes the entire image circle in which a part of the imaging range corresponding nearly to a hemisphere is projected.

Figure 5A:
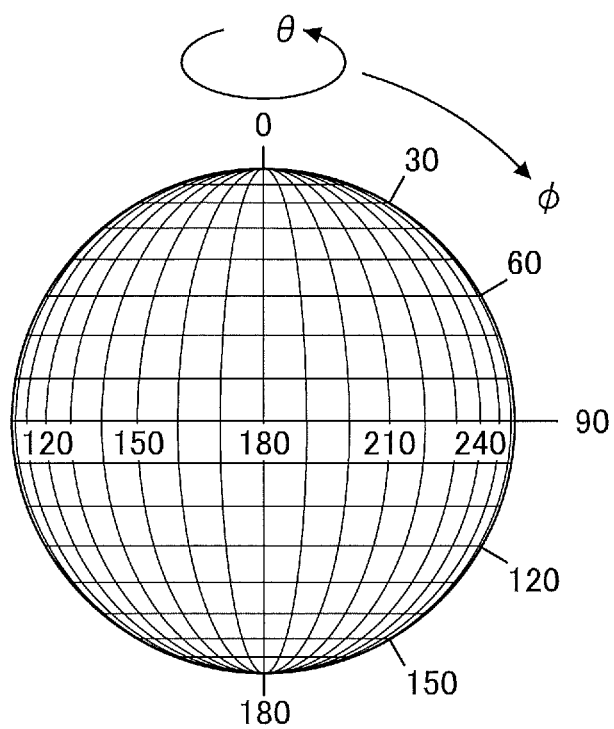
FIG. 5A and FIG. 5B are illustrations for describing a data structure of a spherical image format, according to an embodiment of the present disclosure.
Figure 5B:
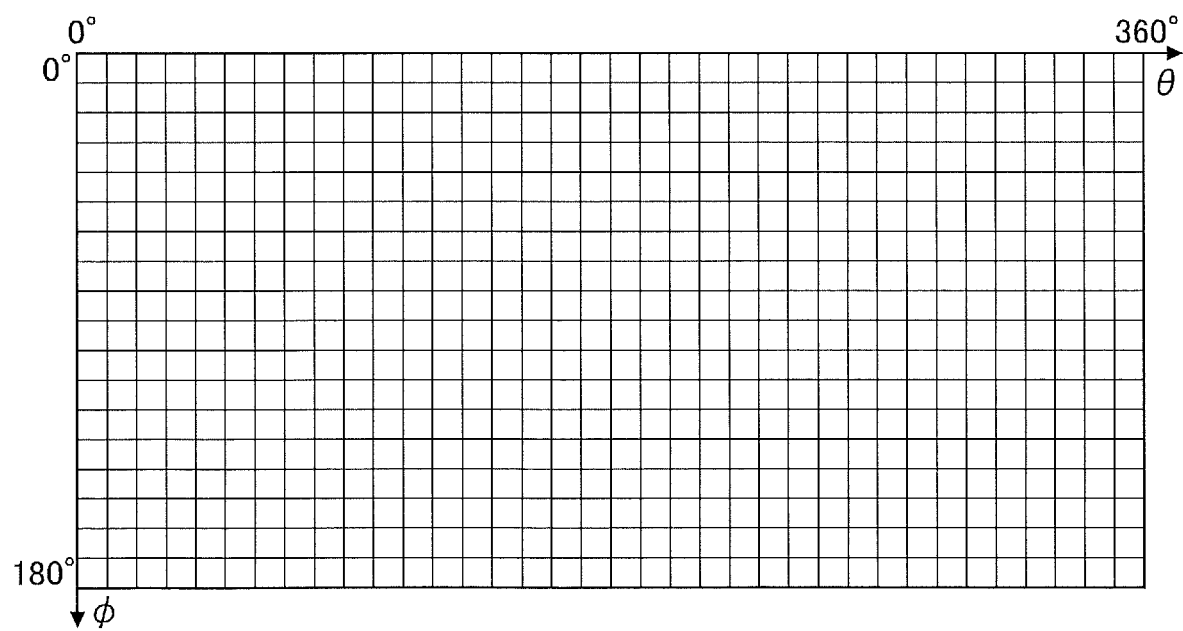

FIG. 5A and FIG. 5B are illustrations for describing a data structure of a spherical image format, according to the present embodiment. As illustrated in FIG. 5A, the spherical image has a shape of a sphere. As illustrated in FIG. 5B, image data of a spherical image format is expressed as an array of pixel values where an incident angle φ, which is an angle relative to a certain axis, and a horizontal angle θ corresponding to an angle of rotation around the certain axis are the coordinates. The horizontal angle θ ranges from 0 to 360 degrees (alternatively, expressed as from −180 to +180 degrees). The incident angle φ ranges from 0 to 180 degrees (alternatively, expressed as from −90 to +90 degrees). The respective coordinate values (θ, φ) are associated with the points on the spherical surface representing all directions from the image capturing position. Thus, the all directions are mapped on the spherical image. The planar coordinates of an image that is captured by a fisheye lens can be associated with the coordinates on the spherical surface in the spherical image format by using the projection function as described above with reference to FIG. 4A and FIG. 4B.

Figure 6B:
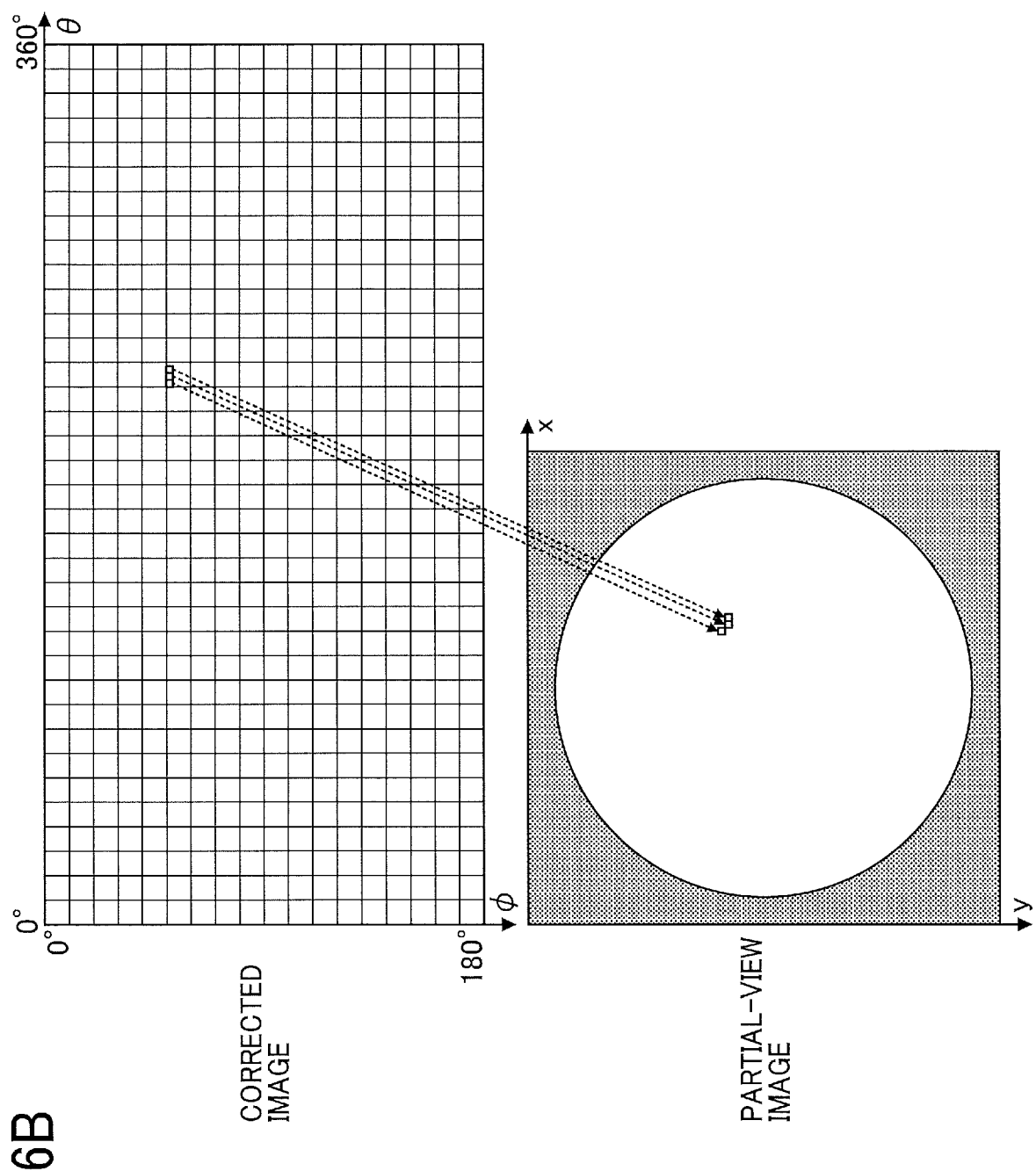

FIGS. 6A and 6B are illustrations for describing an example of projection from a partial-view image represented by a plane coordinate system to an image represented by a spherical coordinate system. FIG. 6A illustrates a distortion correction parameter. The distortion correction parameter defines a projection from a partial-view image represented by a plane coordinate system to an image represented by a spherical coordinate system. The distortion correction parameter is provided for each of the wide-angle lenses. The distortion correction parameter stores information associating the coordinate values (θ, φ) of post-correction images with the coordinate values (x, y) of pre-correction partial-view images that are to be mapped on the coordinate values (θ, φ), for each of the coordinate values (θ, φ), where θ denotes 0 to 360 degrees and φ denotes 0 to 180 degrees.

Since the relation between (θ, φ) and (x, y) is expressed by the equations given below, a corrected image as illustrated is FIG. 6B is obtained according to the equations. The corrected image as illustrated in FIG. 6B is referred to as an equirectangular projection figure (equirectangular projection image).

$$x = \theta/\pi$$

$$y = 2\varphi/\pi$$

FIG. 6B illustrates an example of the correspondence between the coordinate values (θ, φ) of a corrected image and the coordinate values (x, y) of a pre-correction partial-view image. In the example illustrated in FIGS. 6A and 6B, the angle of each one of the pixels is one-tenths of a degree in both φ direction and θ direction. Accordingly, the distortion correction parameter includes information indicating the association of 3600×1800 for each fisheye lens.

Figure 7A:
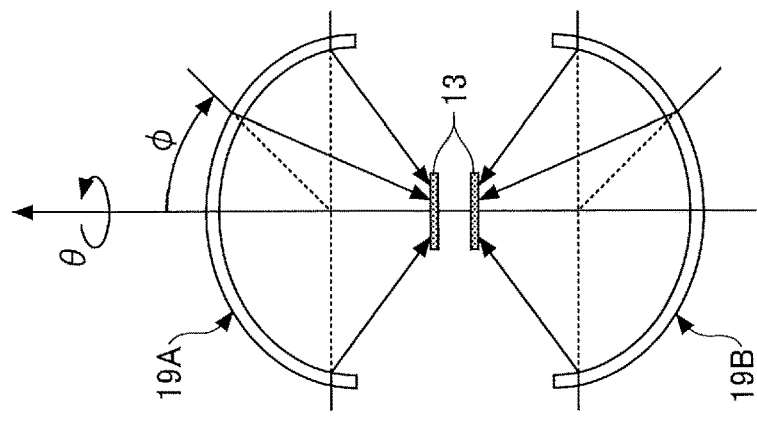
FIGS. 7A and 7B are illustrations for describing how two partial-view images that are captured by two wide-angle lenses are mapped to a spherical coordinate system, according to an embodiment of the present disclosure.
Figure 7B:
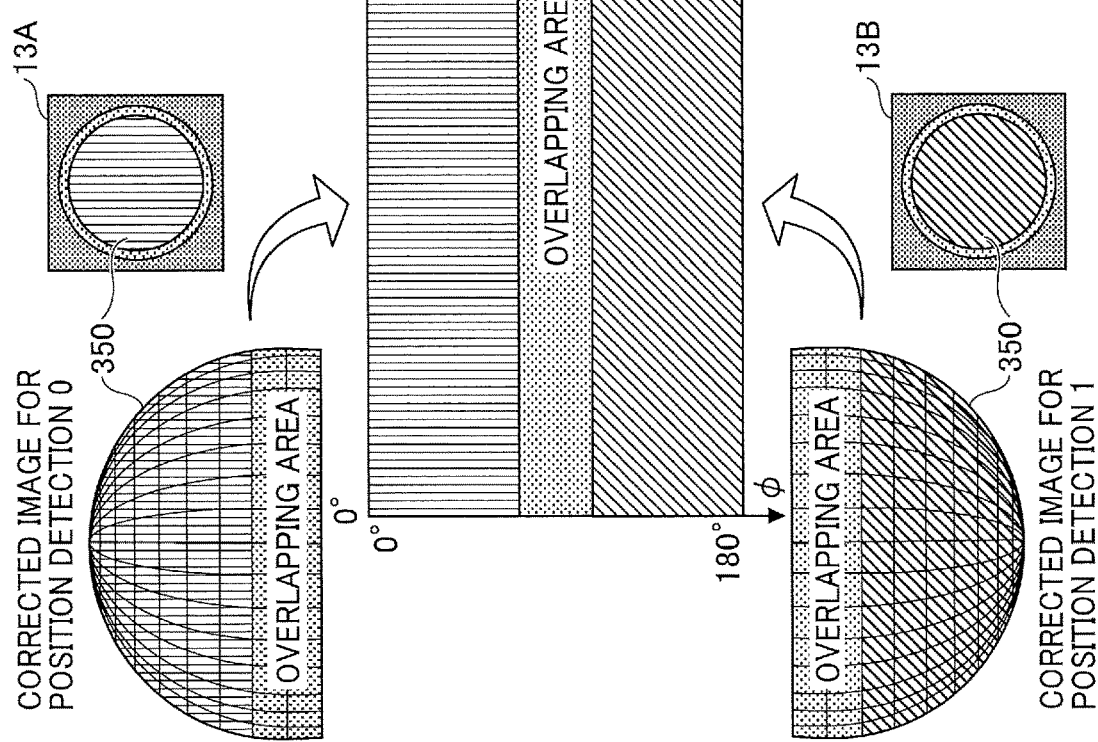

FIGS. 7A and 7B are illustrations for describing how two partial-view images 350 that are captured by two wide-angle lenses are mapped to a spherical coordinate system, according to the present embodiment. FIG. 7A illustrates the imaging optical systems 19A and 19B and the solid-state imaging elements 13A and 13B of the imaging device 40. FIG. 7A illustrates a state where the imaging device 40 illustrated in FIG. 1 is rotated in a clockwise direction by 90 degrees. In FIG. 7A, from among the plurality of lenses of each of the imaging optical systems 19A and 19B, only lenses that are closest to a subject is illustrated. As illustrated in FIG. 7A, the outermost lens of each of the two imaging optical systems 19A and 19 have an angle of view equal to or wider than 180 degrees (i.e., equal to or larger than a hemisphere).

FIG. 7B illustrates an overlapping area 330 that occurs when distortion correction is performed on each of the two partial-view images 350 to obtain a planar image 340. As illustrated in FIG. 7B, when the two partial-view images 350, each having a hemispherical shape, are mapped to an equirectangular projection image, the overlapping area 330 occurs. Examples of a synthesis processing of the overlapping area 330 include alpha blending.

<Functions>

Figure 8:
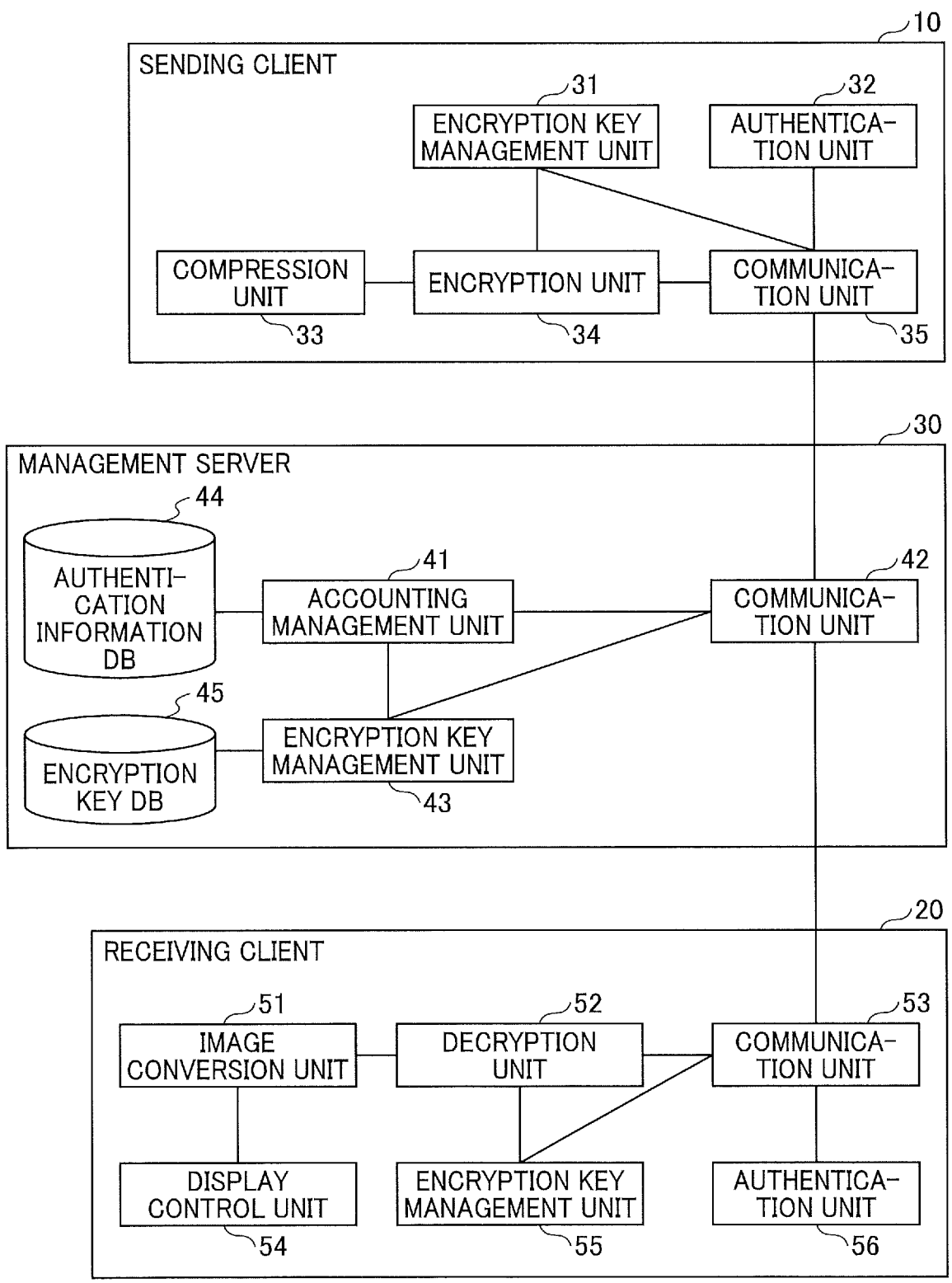
FIG. 8 is a block diagram illustrating an example of functional configurations of a sending client, a management server, and a receiving client, according to an embodiment of the present disclosure.

Next, a description is given of hardware configurations of the sending client 10, the receiving client 20, and the management server 30 according to the present embodiment, with reference to FIG. 8. FIG. 8 is a block diagram illustrating an example of functional configurations of the sending client 10, the management server 30, and the receiving client 20.

<<Sending Client 10>>

The sending client 10 includes an encryption key management unit 31, an authentication unit 32, a compression unit 33, an encryption unit 34, and a communication unit 35. These functional units of the sending client 10 are functions that are implemented by operating one or more hardware elements illustrated in FIG. 2 in cooperation with instructions of the CPU 206 according to a program expanded from the HDD 208 to the RAM 204. This program is distributed from a server for program distribution or distributed as stored in a storage medium.

Figure 9:
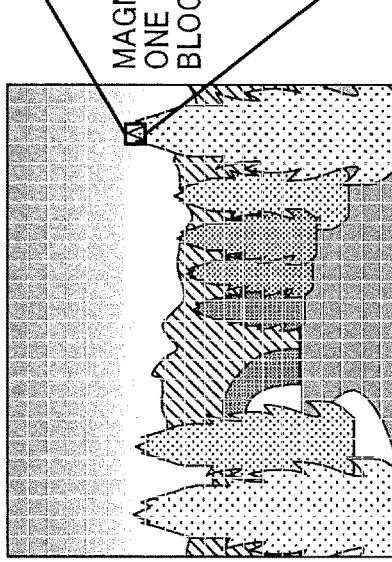
FIG. 9 is an illustration for describing an example of general-purpose image coding, according to an embodiment of the present disclosure.

The compression unit 33 compresses a spherical image converted into an equirectangular projection image as described above to reduce the size of the converted image. Any suitable compression process can be used, such as JPEG, PNG, or GIF. Referring to FIG. 9, the compression process is described.

The encryption unit 34 encrypts an encryption angle of view of the compressed spherical image. In other words, the encryption unit 34 encrypts an angle of view other than the normal angle of view as the encryption angle of view. In one example, the normal angle of view is determined in advance. In another example, the normal angle of view is determined through a process described below. The encryption unit 34 divides the spherical image into the normal angle of view and the other angle of view, i.e., the encryption angle of view. Further, the encryption unit 34 divides the encryption angle of view into a plurality of rectangular areas and encrypts each of the plurality of rectangular areas. The detailed description of the encryption process is provided below, with reference to FIG. 10.

When the normal angle of view or the encryption angle of view is not determined in advance, a user specifies a desired normal angle of view or an encryption angle of view, for example. In another example, the encryption unit 34 automatically determines the normal angle of view or the encryption angle of view. For example, the user specifies his or her desired encryption angle of view (or the normal angle of view) by using the mouse or the touch panel. An area designated by the user as the encryption angle of view from among an entire area of the spherical image varies depending on subjects of the spherical image, for example. Examples of the area designated by the user as the encryption angle of view include, but not limited to, a beautiful landscape, information with high privacy (e.g., a face of a person, a name of a person, etc.), information such as characters specifying a place, a subject to which though should be given in view of public policy. In the alternative example, the encryption unit 34 performs image recognition to detect an object that is set in advance, and encrypts an area including the detected object. For image recognition, a predetermined subject is learned by machine learning such as the perceptron, deep learning, support-vector machine, logistic regression, naive Bayes, decision tree, or random forests.

In still another example, the user specifies a desired subject to be included in the normal angle of view instead of a subject to be included in the encryption angle of view. In still another example, the encryption unit 34 automatically recognizes a subject to be included in the normal angle of view instead of a subject to be included in the encryption angle of view. In these cases, an angle of view other than the specified or recognized normal angle of view is identified as the encryption angle of view.

Further, the encryption unit 34 attaches, for example, the coordinates of the diagonal vertices of the encryption angle of view to the spherical image to specify the encryption angle of view. For example, information indicating which angle of view of each spherical image is encrypted is attached as metadata. It is preferable that the metadata also includes the coordinates of diagonal vertices of the normal angle of view. When the normal angle of view is specified, both the general viewer and the authorized viewer can view the unencrypted angle of view immediately after the spherical image is displayed.

The encryption key management unit 31 manages an encryption key that is used for encrypting the encryption angle of view of the spherical image. The encryption key is transmitted from the management server 30. For example, one encryption key is transmitted in one communication session. In another example, a different encryption key is transmitted at constant intervals even during one communication session. The management server 30 stores a decryption key used for decrypting data encrypted by the encryption key. Instead of preparing the encryption key and the decryption key for each communication session, a pair of the encryption key and the decryption key can be prepared for each spherical image. In another example, a pair of the encryption key and the decryption key can be prepared for a plurality of spherical images.

The authentication unit 32 transmits a request for authentication of a user of the sending client 10 to the management server 30, and acquires an authentication result. Known authentication methods can be used for this authentication process. For example, the authentication unit 32 transmits, to the management server 30, authentication information such as a combination of a user ID (user identification information) and a password, a card number of an IC card, biometric information (fingerprint, face, etc.).

The communication unit 35 transmits and receives various types of information to and from the management server 30. In the present embodiment, the communication unit 35 transmits, the authentication information, the encryption key, and the spherical image to the management server 30. In one example, the communication unit 35 transmits the encryption angle of view and the normal angle of view separately. In another example, the communication unit 35 transmits the encryption angle of view and the normal angle of view as one spherical image. When the communication unit 35 transmits the encryption angle of view and the normal angle of view separately, the communication unit 35 also transmits information used for combining the divided angle of views to one spherical image, such as the number of divisions.

<<Management Server 30>>

The management server 30 includes an accounting management unit 41, a communication unit 42, and an encryption key management unit 43. These functional units of the management server 30 are functions that are implemented by operating one or more hardware elements illustrated in FIG. 2 in cooperation with instructions of the CPU 206 according to a program expanded from the HDD 208 to the RAM 204. This program is distributed from a server for program distribution or distributed as stored in a storage medium.

The management server 30 further includes an authentication information database (DB) 44 and an encryption key DB 45, each of which is stored in the HDD 208 or the like illustrated in FIG. 2. First, a description is given of the authentication information DB 44 and the encryption key DB 45.

TABLE 1

| Viewer ID | Password | Authorized User |
|---|---|---|
| U001 | **** | True |
| U002 | **** | True |
| U003 | **** | False |

Table 1 schematically illustrates information stored in the authentication information DB 44. The authentication information DB 44 stores, in association with each of viewer IDs, a password and information indicating whether a user identified the associated viewer ID is an authorized viewer. When "True" is stored in the item of the authorized viewer, this viewer is identified as an authorized viewer. By contrast, when "False" is stored in the item of the authorized viewer, this viewer is identified as a general viewer. The viewer ID is identification information for identifying or specifying a viewer. ID is an abbreviation for "identification," and means an identifier or identification information. ID is any one of a name, a symbol, a character string, a numerical value, or a combination of at least two of these items, which is used for identifying a specific object from among a plurality of objects. Examples of the viewer ID include an email address.

TABLE 2

| Communication Session ID (Transmission Side) | Encryption Key | Decryption Key | Communication Session ID (Reception Side) |
|---|---|---|---|
| T001 | ****** | ****** | R001 |
| T002 | ****** | ****** | R002 |
| T003 | ****** | ****** | R003 |

Table 2 schematically illustrates information stored in the encryption key DB 45. The encryption key DB 45 stores, in association with each of communication session IDs on a transmission side, an encryption key used for encrypting a part of a spherical image transmitted in a communication session identified by the associated communication ID and a decryption key used for decrypting the spherical image encrypted by the associated encryption key. The communication session ID on the transmission side is identification information for identifying or specifying a communication session between the sending client 10 and the management server 30. After establishing a communication session with the sending client 10, the management server 30 generates an encryption key and a decryption key and stores the generated encryption key and decryption key in the encryption key DB 45 in association with a communication session ID identifying the established communication session. The receiving client 20 designates the sending client 10 by the ID of the receiving client, for example. In another example, the sending client 10 can designate the receiving client 20. Since the management server 30 manages the communication session ID on the transmission side to which the sending client 10 is connected and the communication session ID on the reception side to which the receiving client 20 is connected, the communication session ID on the transmission side and the communication on the reception side are associated with each other.

Thus, the encryption key and the decryption key are managed for each communication session. This facilitates management of the keys. In another example, the encryption key and the decryption key can be managed for each image. Managing the encryption key and the decryption key for each image is applicable when the spherical image is a still image. By contrast, when the spherical image is video, the video includes too many images to manage the encryption key and the decryption key for each image.

Next, a description is given of the functions of the management server 30. The accounting management unit 41 manages authentication information of viewers and authenticates a viewer. When the authentication is successful, the accounting management unit 41 refers to the authentication information DB 44 to determine whether the authenticated viewer is an authorized viewer. Example of the authorized viewer include, but not limited to, a paying user who has paid a fee. In another example, the authorized viewer can be a registered member.

The encryption key management unit 43 manages an encryption key and a decryption key for each communication session using the encryption key DB 45. Specifically, when the sending client 10 starts a communication session, the encryption key management unit 43 generates an encryption key and a decryption key and registers the generated encryption key and decryption key in the encryption key DB 45. Further, the encryption key management unit 43 transmits the encryption key to the sending client 10 via the communication unit 42. Furthermore, when a communication session on the reception side is connected, the encryption key management unit 43 identifies the communication session ID of the sending client 10 with which the receiving client 20 communicates, and transmits the decryption key associated with the identified communication session ID to the receiving client 20 via the communication unit 42. Although in the present embodiment, a description is given on the assumption that the public key cryptosystem is used in which an encryption key and decryption key are different from each other, this is just an example. In another example, common key cryptosystem is used in which the same key is used for encryption and decryption.

The communication unit 42 transmits and receives various types of information to and from the sending client 10 and the receiving client 20. Specifically, the communication unit 42 transmits the encryption key to the sending client 10 and receives the spherical image from the sending client 10. Further, the communication unit 42 transmits the spherical image to the receiving client 20, when the user of the receiving client 20 is a general viewer. The communication unit 42 transmits the spherical image and the decryption key to the receiving client 20, when the user of the receiving client 20 is an authorized viewer.

<<Receiving Client 20>>

The receiving client 20 includes an image conversion unit 51, a decryption unit 52, a communication unit 53, a display control unit 54, an encryption key management unit 55, and an authentication unit 56. These functional units of the receiving client 20 are functions that are implemented by operating one or more hardware elements illustrated in FIG. 2 in cooperation with instructions of the CPU 206 according to a program expanded from the HDD 208 to the RAM 204. This program is distributed from a server for program distribution or distributed as stored in a storage medium.

The communication unit 53 transmits and receives various types of information to and from the management server 30. For example, the communication unit 53 transmits the authentication information to the management server 30. Further, for example, the communication unit 53 receives the spherical image from the management server 30, when the user of the receiving client 20 is a general viewer. When the user of the receiving client 20 is an authorized viewer, the communication unit 53 receives the spherical image and the decryption key from the management server 30. When the encryption angle of view and the normal angle of view are transmitted separately from the management server 30, the communication unit 53 receives each of the encryption angle of view and the normal angle of view. When the encryption angle of view and the normal angle of view are transmitted separately from the management server 30, the communication unit 53 determines that one spherical image is received, based on the information used for combining the divided angle of views to one spherical image, such as the number of divisions.

The authentication unit 56 receives an input of the authentication information, transmits the authentication information to the management server 30 via the communication unit 53, and acquires an authentication result (success or failure) from the management server 30. If the authentication is successful, the communication unit 53 receives the decryption key. The authentication process can be omitted in a case where a viewer is the general viewer.

The encryption key management unit 55 manages the decryption key transmitted from the management server 30 during the communication session. For example, the encryption management unit manages the communication session ID and the decryption key in association with each other.

The decryption unit 52 decrypts the encryption angle of view of the spherical image by using the decryption key.

More specifically, the decryption unit 52 decrypts a part of the spherical image, which part is transmitted as the encryption angle of view. Alternatively, the decryption unit 52 refers to the metadata attached to the spherical image to identify the encryption angle of view of the spherical image and decrypts the identified encryption angle of view.

The image conversion unit 51 shapes the spherical image so that the display device 202 can display the spherical image. For example, the image conversion unit 51 maps an equirectangular projection image to a sphere surface, to allow a user to specify a desired angle of view of the spherical image seen from the center of the solid sphere and to view the specified angle of view. For example, the equirectangular projection image is mapped to the sphere by using a library such as Open Graphics Library for Embedded Systems (OpenGL ES). Immediately after the spherical image is displayed, the normal angle of view included in the metadata is a display range. Furthermore, the image conversion unit 51 transforms the three-dimensional sphere into a two-dimensional plane by perspective projection transformation so that the display device 202 can display a certain angle of view of the spherical image such as the normal angle of view.

The display control unit 54 displays the spherical image converted by the image conversion unit 51 on the display device 202.

<Example of Compression Process>

FIG. 9 is an illustration for describing an example of general-purpose image coding. On the left side of FIG. 9, an original image A is illustrated in which pixel values are represented by shading. In the middle of FIG. 9, a matrix B is illustrated which represents the values of pixels constituting one of blocks of the original image. In general, an original image is divided into a plurality of blocks before compression. In the example of FIG. 9, one block is constituted by 8×8 pixels. In the example of FIG. 9, all blocks have the same size (8×8) in the vertical and horizontal direction. In another example, the plurality of blocks can have different sizes.

The compression unit 33 of the sending client 10 performs, for example, discrete cosine transform (DCT) for compression. The DCT transformation is a compression method that implements a high compression ratio by performing spatial frequency analysis and thinning out data of a high frequency area (an area where the image changes finely). On the right side of FIG. 9, a matrix C is illustrated which represents the pixel values of the block after the DCT transformation. Low frequency components reside in the top left of the matrix, and high frequency components reside in the bottom right of the matrix. As illustrated in the matrix C, the high frequency components are close to zero. The high frequency components are regarded as zero to reduce an amount of information. In other words, the compression unit 33 performs zigzag scanning to extract only low frequency components, and thereby an image after compression is obtained. The equirectangular projection image of the spherical image is compressed in substantially the same manner.

<Example of Encryption Angle of View>

Figure 10:
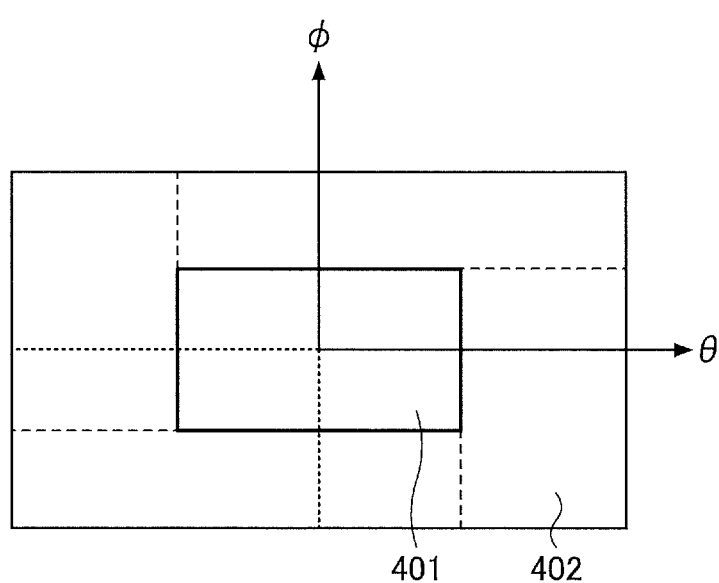
FIG. 10 is an illustration for describing an encryption angle of view of a spherical image, according to an embodiment of the present disclosure.

FIG. 10 is an illustration for describing an encryption angle of view of a spherical image. FIG. 10 illustrates a spherical image developed to 180×360 degrees in the equirectangular projection. For example, the receiving client 20 extracts a rectangular area by specifying diagonal vertices of the normal angle of view with the latitude and the longitude to extract the normal angle of view 401.

Further, when encrypting the encryption angle of view 402, the encryption unit 34 divides the encryption angle of into a plurality of rectangular areas. FIG. 10 illustrates an example in which one encryption angle of view 402 is divided into four rectangular areas.

In another example, the encryption unit 34 can encrypts the encryption angle of view of the spherical image without dividing the encryption angle of view as illustrated in FIG. 10.

<Overall Operation>

Figure 11:
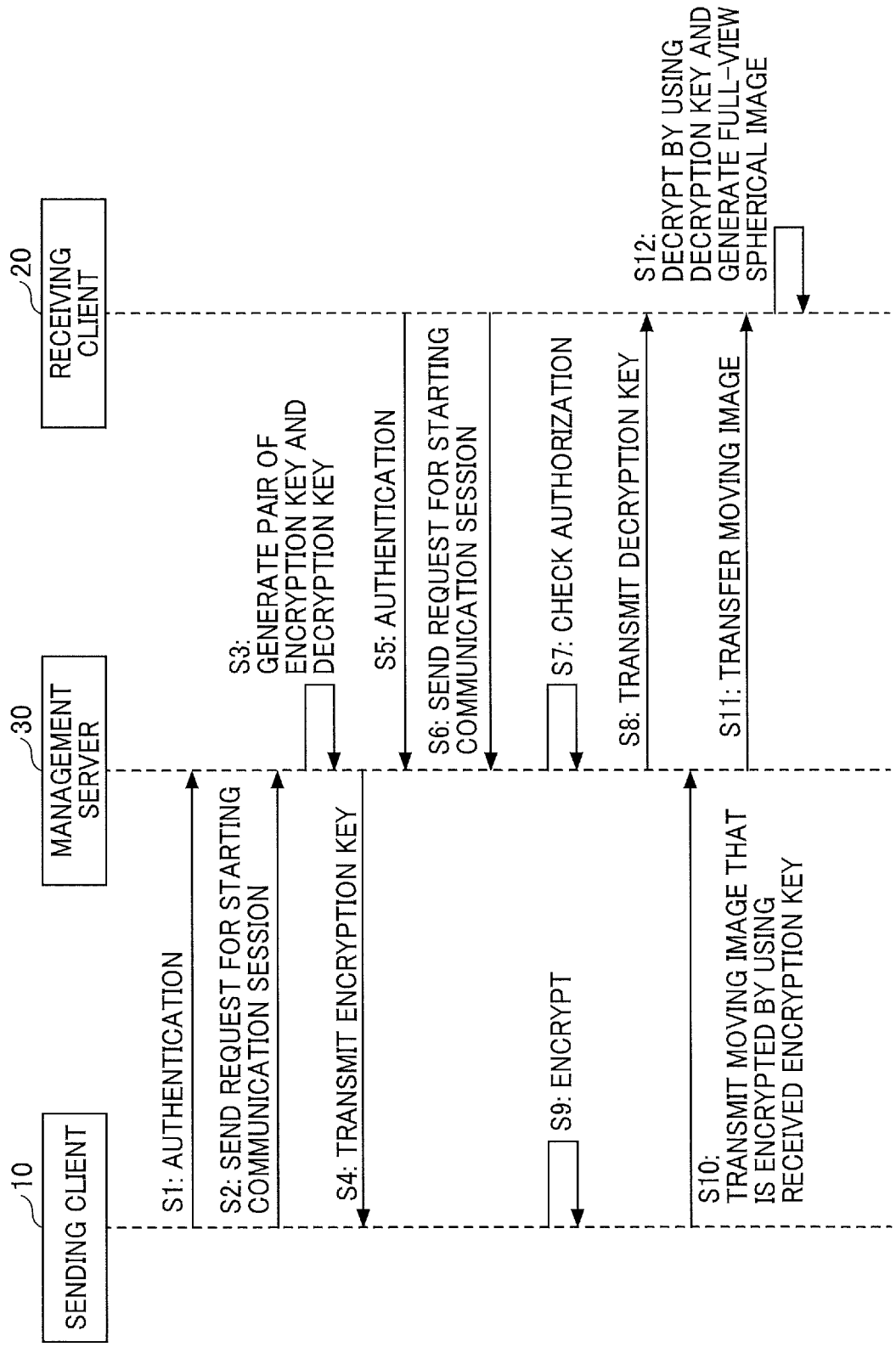
FIG. 11 is a sequence diagram illustrating overall operation performed by the distribution system, according to an embodiment of the present disclosure.

FIG. 11 is a sequence diagram illustrating overall operation performed by the distribution system 100.

S1: The authentication unit 32 of the sending client 10 transmits authentication information via the communication unit 35 to, to request the management server 30 for authentication. In the following, a description is given on the assumption that the authentication is successful.

S2: The communication unit 35 of the sending client 10 requests the management server 30 to start a communication session for transmitting a spherical image (still image or video).

S3: The encryption key management unit 43 of the management server 30 generates a pair of an encryption key and a decryption key corresponding to the communication session on the transmission side, and registers the generated pair of the encryption key and decryption key in the encryption key DB 45.

S4: The communication unit 42 of the management server 30 transmits the encryption key to the sending client 10.

S5: The receiving client 20 also transmits authentication information via the communication unit 53, and requests the management server 30 for authentication. In the following, a description is given on the assumption that the authentication is successful.

S6: The communication unit 53 of the receiving client 20 requests the management server 30 to start a communication session for receiving a spherical image (still image or video). The sending client 10 specifies the receiving client 20. Alternatively, the receiving client 20 specifies the sending client 10. The management server 30 identifies the sending client 10 and the receiving client 20, which are communicating with each other.

Thus, the encryption key management unit 43 of the management server 30 identifies the communication session in which the sending client 10 is participating and the communication session in which the receiving client 20 is participating. The encryption key management unit 43 registers, in the encryption key DB 45, the communication session ID on the reception side in association with the communication session ID on the transmission side.

S7: The accounting management unit 41 refers to the authentication information DB 44 to determine whether the authenticated viewer is an authorized viewer. In the following, a description is given on the assumption that the viewer is an authorized viewer.

S8: The encryption key management unit 43 of the management server 30 transmits the decryption key that is read from the encryption key DB 45 to the receiving client 20 via the communication unit 42. This decryption key can be easily identified since it is associated with the communication session ID on the receiving side.

S9: The encryption unit 34 of the sending client 10 encrypts the encryption angle of view of the spherical image.

S10: The communication unit 35 of the sending client 10 transmits the encrypted spherical image to the management server 30. In other words, the communication unit 35 transmits the encryption angle of view and the normal angle of view separately. Alternatively, the communication unit 35 transmits the encryption angle of view and the normal angle of view as one spherical image.

S11: The communication unit 42 of the management server 30 receives the encrypted spherical image, and transmit the encrypted spherical image to the receiving client 20 which is in communication with the sending client 10.

S12: The communication unit 53 of the receiving client 20 receives the encrypted spherical image (i.e., the encryption angle of view and the normal angle of view). The decryption unit 52 decrypts the encrypted spherical image by using the decryption key. Further, the image conversion unit 51 converts the spherical image so that the display device 202 can display the spherical image. The display control unit 54 causes the display device 202 to display the spherical image.

A description is given heretofore with reference to FIG. 11 of an example case in which one receiving client 20 is included in the distribution system 100. In another example, a plurality of receiving clients 20 can performs the processes from step S5 to step S8 asynchronously. In addition, the processes by the sending client 10 and the processes by the receiving client 20 can be performed asynchronously.

<<Encryption Process>>

Figure 12:
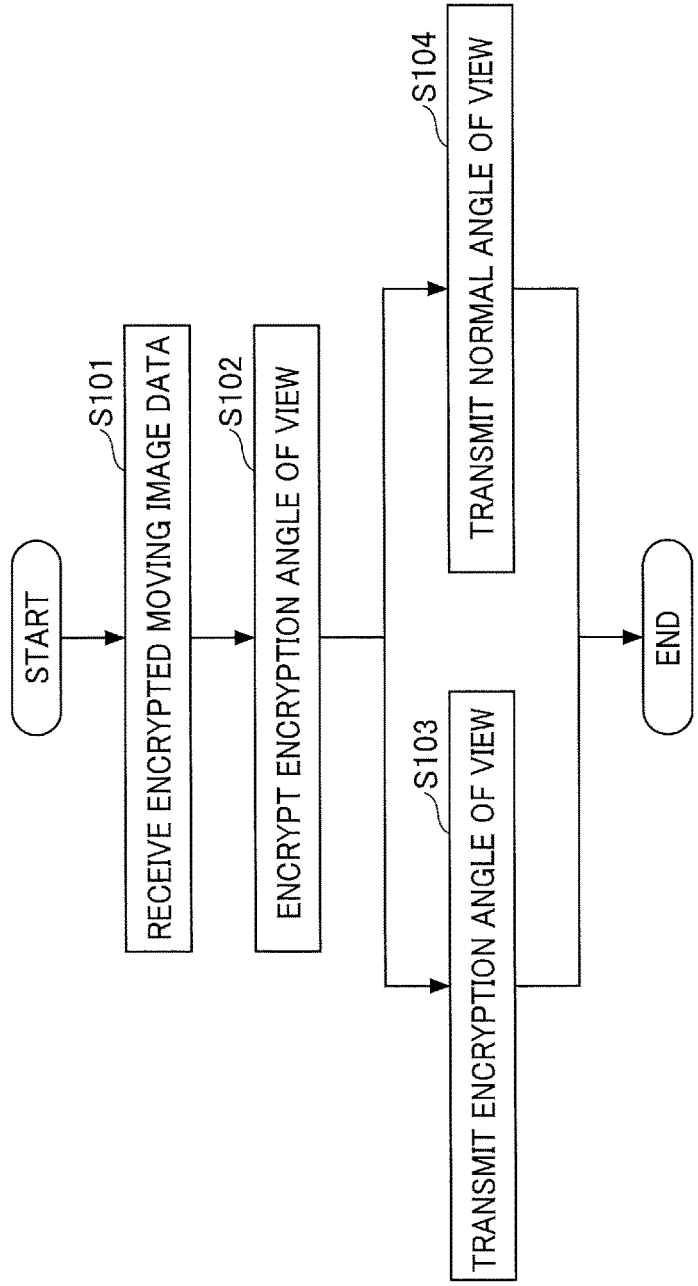
FIG. 12 is a flowchart illustrating an encryption process performed by an encryption unit of the sending client, according to an embodiment of the present disclosure.

Referring to FIG. 12, an encryption process by the sending client 10 is described. FIG. 12 is a flowchart illustrating an encryption process performed by the encryption unit 34 of the sending client 10.

In step S101, the encryption unit 34 receives an encoded spherical image from the compression unit 33.

In step S102, the encryption unit 34 encrypts the encryption angle of view using the encryption key managed by the encryption key management unit 31. In a case where the encryption angle of view and the normal angle of view are transmitted separately, the metadata includes information indicating that the transmitted angle of view is an encryption angle of view. The metadata further includes the coordinates of the encryption angle of view and the coordinates of the normal angle of view to reconstruct one spherical image. By contrast, in a case the encryption angle of view and the normal angle of view are transmitted as one spherical image, the metadata includes at least the coordinates of the encryption angle of view indicating a position of the encryption angle of view in the spherical image.

In steps S103 and S104, the communication unit 35 transmits the encryption angle of view and the normal angle of view to the management server 30, respectively. In another example, the communication unit 35 transmits one spherical image including the encryption angle of view on which the encryption process has been performed, instead of dividing the spherical image into the encryption angle of view and the normal angle of view.

<<Decryption Process>>

Referring to FIG. 13, a decryption process by the receiving client 20 is described. FIG. 13 is a flowchart illustrating a decryption process performed by the decryption unit 52 of the receiving client 20.

In step S201, the communication unit 53 of the receiving client 20 receives the encryption angle of view.

In step S202, the decryption unit 52 decrypts the encryption angle of view by using the decryption key. When the encryption angle of view angle of view and the normal angle of view are received separately, the decryption unit 52 decrypts an image that is transmitted as the encryption angle of view. When the encryption angle of view and the normal angle of view are transmitted as one spherical image, the decryption unit 52 decrypts the encryption angle of view indicated by the metadata.

In step S203, since the spherical image has been compressed, the decryption unit 52 decompresses (decodes) the decrypted encryption angle of view.

In step S204, the communication unit 53 of the receiving client 20 receives the normal angle of view.

In step S205, since the spherical image has been compressed, the decryption unit 52 decompresses (decodes) the normal angle of view. Since the normal angle of view is not transmitted as an encrypted angle of view, decryption is not performed.

In step S206, the image conversion unit 51 combines the decrypted encryption angle of view and the normal angle of view based on the coordinates of the encryption angle of view and the coordinates of the normal angle of view described in the metadata to generate the entire spherical image. In a case where the spherical image is not divided, this combining process is omitted.

As described heretofore, the distribution system 100 according to the present embodiment encrypts a part of a spherical image and distributes the spherical image having the encrypted part. This restricts viewing of the encryption angle of view by the general viewer, and permits viewing of the entire spherical image by the authorized viewer. Therefore, viewing of a part of the spherical image can be controlled.

<Variation>

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

For example, the normal angle of view that is not encrypted may have any shape other than square. In addition, the spherical image can include a plurality of fragments of the normal angle of view and/or the encryption angle of view.

Further, the authorization given to the authorized viewer can be classified into a plurality of levels. The higher-level authorization the authorized viewer has, the larger encryption angle of view that the authorized viewer can view. In this case, the management server 30 generates a plurality of encryption keys and decryption keys, and associates the pairs of encryption key and decryption key with the authorizations. The sending client 10 divides the encryption angle of view into a plurality of areas and encrypts the plurality of areas with different encryption keys. The management server 30 transmits, to the receiving client 20, the decryption key corresponding to the authorization that the authorized viewer has.

In addition, although referring to FIG. 8, the example case is described in which the sending client 10 performs encryption, the management server 30 can also perform encryption. In this case, the management server 30 does not have to transmit the encryption key to the sending client 10. However, since the encryption angle of view is plain text in a path from the sending client 10 to the management server 30, the entire spherical image can be viewed when a third party taps communication between the sending client 10 and the management server 30. By contrast, when the sending client 10 performed encryption as described above with reference to FIG. 8, the security in the path from the sending client 10 to the management server 30 can also be enhanced.

In another example, the imaging device 40 and the sending client 10 can be configured as a single integrated unit. In still another example, the imaging device 40 can be fixed to the sending client 10. Alternatively, the imaging device 40 can be detachable from the sending client 10.

Further, although in the present embodiment, a description is given heretofore of an example case in which a part of the spherical image is encrypted, a part of a planar image of a general angle of view can be encrypted.

Furthermore, in the example of functional configuration as illustrated in FIG. 8, processes performed by the sending client 10, the management server 30 and the receiving client 20 are divided based on main functions in order to facilitate understanding of processes. No limitation is intended by how the processes are divided or by the name of the processes. The processes implemented by the sending client 10, the management server 30 and the receiving client 20 can be divided to a larger number of processing units according to contents of processes. Further, one process can be divided to include a larger number of processes.

In known image distribution systems, there is still a drawback that it is difficult to control viewing of a partial angle of view of a wide-angle image such as a spherical image. A detailed description is given below of this issue. Firstly, since a spherical image has a very wide-angle, a terminal apparatus displays a viewing area that is specified by a direction of line of sight and an angle of view from a virtual viewpoint at the center of the spherical image. For this reason, a user of the terminal apparatus specifies a desired viewing area of the spherical image by operating a mouse or a touch panel.

Although the known image distribution system can distribute the spherical image, which can be either a still image or a video image, there is a case where one wants to control viewing of a part of the angle of view of the spherical image. In other words, when the spherical image is distributed without any control on viewing, all viewers can view the entire spherical image. When the spherical image is a video image, more information is presented to all viewers. Thus, the known image distribution system, when distributing a spherical image, cannot support a case where a distributor wants to permit a part of the spherical image to be viewed only by a receiver(s) who pays extra viewing fee, for example.

The same issue will arise also in a case where an image to be distributed is not a spherical image but a planar image having a general angle of view, if the planar image has relatively wide angle of view.

According to one more embodiments of the present disclosure, a distribution system is provided that can control viewing of a part of an angle of view of a wide-angle image such as a spherical image.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A distribution system comprising:
   an information processing apparatus;
   a sending client terminal communicably connected to the information processing apparatus via a network; and
   a receiving client terminal communicably connected, to the information processing apparatus via the network; wherein
   the information processing apparatus includes circuitry configured to
       provide an encryption key to the sending client terminal,
       provide a decryption key corresponding to the encryption key to the receiving client terminal in a case in which the receiving client terminal is operated by an authorized viewer,
       receive a plurality of images constituting a video image from the sending client terminal, the video image being a spherical image obtained by capturing surroundings in 360-degree directions, and
       transmit the plurality of images constituting the video image received from the sending client terminal to the receiving client terminal;
   the sending client terminal includes circuitry configured to
       encrypt a part of each of the plurality of images constituting the video image using the encryption key received from the information processing apparatus, the part having an angle of view other than a normal angle of view, and
       transmit the plurality of images constituting the video image to the information processing apparatus with metadata of the video image via the network, each of the plurality of images including the part that is encrypted having the angle of view other than the normal angle of view, and other part that is not encrypted having the normal angle of view, the part having the angle of view other than the normal angle of view being transmitted separately from the other part having the normal angle of view, and the metadata of the video image including information indicating that the part having the angle of view other than the normal angle of view is encrypted, coordinates of the part having the angle of view other than the normal angle of view, and coordinates of the other part having the normal angle of view;
   the receiving client terminal includes circuitry configured to
       receive, from the information processing apparatus, the plurality of images constituting the video image and the metadata of the video image that are transmitted from the sending client terminal to the information processing apparatus,
       decrypt the part of each of the plurality of images having the angle of view other than the normal angle of view by using the decryption key received from the information processing apparatus, and
       generate and display the video image of an entirety of the spherical image by combining the other part of each of the plurality of images that is not encrypted having the normal angle of view and the decrypted part of each of the plurality of images having the angle of view other than the normal angle of view, based on the coordinates of the part having the angle of view other than the normal angle of view and the coordinates of the other part having the normal angle of view included in the metadata of the video image.

2. The distribution system of claim 1, the information processing apparatus further comprising:

a memory to store, for each of a plurality of viewers who view the video image, information indicating whether each of the plurality of viewers is the authorized viewer, wherein the circuitry of the information processing apparatus is further configured to:
perform authentication for a particular viewer who views the video image from among the plurality of viewers; and
provide the decryption key to the receiving client terminal, when the information stored in the memory in association with the particular viewer who is successfully authenticated indicates that the particular viewer is the authorized viewer.

3. The distribution system of claim 1, wherein the authorized viewer is a user who has paid a fee to view the video image.

4. The distribution system of claim 1, wherein
the sending client terminal initiates a communication session with the information processing apparatus,
the information processing apparatus generates the encryption key and the decryption key for each communication session with the sending client terminal, and
the information processing apparatus transmits, to the receiving client terminal that is to receive the video image transmitted from the sending client terminal in the communication session, the decryption key corresponding to the encryption key generated for each communication session.

5. A client terminal configured to display a video image received from a sending client terminal via an information processing apparatus, the client terminal being communicably connected to an information processing apparatus via a network, the video image being a spherical image obtained by capturing surroundings in 360-degree directions, the video image including a plurality of images each including a part that is encrypted and has an angle of view other than a normal angle of view and other part that is not encrypted by the sending client terminal and has the normal angle of view, and including metadata including information indicating that the part having the angle of view other than the normal angle of view is encrypted, coordinates of the part having the angle of view other than the normal angle of view, and coordinates of the other part having the normal angle of view, the client terminal comprising circuitry to:
receive, from the information processing apparatus, the part of each of the plurality of images;
receive, from the information processing apparatus, the other part of each of the plurality of images, the other part of each of the plurality of images being received separately from the part of each of the plurality of images;
receive, from the information processing apparatus, a decryption key for decrypting the part of each of the plurality of images having the angle of view other than the normal angle of view;
decrypt the part of each of the plurality of images having the angle of view other than the normal angle of view by using the decryption key received; and
generate and display the video image of an entirety of the spherical image by combining the other part of each of the plurality of images that is not encrypted and has the normal angle of view and the decrypted part of each of the plurality of images having the angle of view other than the normal angle of view, based on the coordinates of the part having the angle of view other than the normal angle of view and the coordinates of the other part having the normal angle of view included in the metadata.

6. A method of distributing a video image of a spherical image obtained by capturing surroundings in 360-degree directions, the method being performed by a distribution system including an information processing apparatus, a sending client terminal communicably connected to the information processing apparatus via a network, and a receiving client terminal communicably connected to the information processing apparatus via the network, the method comprising:
providing, by the information processing apparatus, an encryption key to the sending client terminal;
providing, by the information processing apparatus, a decryption key corresponding to the encryption key to the receiving client terminal in a case in which the receiving client terminal is operated by an authorized viewer;
encrypting, by the sending client terminal, a part of each of a plurality of images constituting a video image using the encryption key received from the information processing apparatus, the part having an angle of view other than a normal angle of view;
transmitting, by the sending client terminal, the plurality of images constituting the video image to the information processing apparatus with metadata of the video image, via the network, each of the plurality of images including the part that is encrypted having the angle of view other than the normal angle of view, and other part that is not encrypted having the normal angle of view, the part having the angle of view other than the normal angle of view being transmitted separately from the other part having the normal angle of view, and the metadata including information indicating that the part having the angle of view other than the normal angle of view is encrypted, coordinates of the part having the angle of view other than the normal angle of view, and coordinates of the other part having the normal angle of view;
receiving, by the sending client terminal, from the information processing apparatus, the plurality of images constituting a video image and the metadata of the video image that are transmitted to the information processing apparatus by the sending client terminal;
decrypting, by the sending client terminal, the part of each of the plurality of images having the angle of view other than the normal angle of view by using the decryption key received from the information processing apparatus; and
generating and displaying, by the sending client terminal, the video image of an entirety of the spherical image by combining the other part of each of the plurality of images that is not encrypted and has the normal angle of view and the decrypted part of each of the plurality of images having the angle of view other than the normal angle of view, based on the coordinates of the part having the angle of view other than the normal angle of view and the coordinates of the other part having the normal angle of view included in the metadata of the video image.

* * * * *